United States Patent [19]

Peiler

[11] 4,330,000
[45] May 18, 1982

[54] GRATE ADJUSTING ARRANGEMENT FOR AN AXIAL FLOW ROTARY THRESHER

[75] Inventor: Rolf W. Peiler, Zweibrucken, Fed. Rep. of Germany

[73] Assignee: Deere & Company, Moline, Ill.

[21] Appl. No.: 208,618

[22] Filed: Nov. 20, 1980

[30] Foreign Application Priority Data

Dec. 17, 1979 [DE] Fed. Rep. of Germany ....... 2950722

[51] Int. Cl.³ ............................................. A01F 12/28
[52] U.S. Cl. .................................. 130/27 L; 130/27 S
[58] Field of Search .................... 130/27 T, 27 S, 27 L

[56] References Cited

U.S. PATENT DOCUMENTS

| | | | |
|---|---|---|---|
| 1,257,802 | 2/1918 | Butterworth | 130/27 S |
| 2,053,148 | 9/1936 | James | 130/27 |
| 3,589,111 | 6/1971 | Gullickson | 56/12.8 |
| 3,871,384 | 3/1975 | Depauw | 130/27 |
| 3,974,837 | 8/1976 | Applegate | 130/27 S |

FOREIGN PATENT DOCUMENTS

| | | | |
|---|---|---|---|
| 6425 | 8/1901 | Austria | 130/27 L |
| 70769 | 12/1942 | | 130/27 L |
| 407971 | 12/1944 | Italy | 130/27 S |
| 98894 | 5/1940 | Sweden | 130/27 L |
| 106043 | 12/1942 | Sweden | 130/27 S |
| 508196 | 6/1939 | United Kingdom | 130/27 L |

Primary Examiner—Paul J. Hirsch

[57] ABSTRACT

In an axial flow rotary separator, a threshing or separating grate, surrounding and generally concentric with a rotor is made up of two generally semi-cylindrical halves. An interconnected adjusting linkage arrangement is connected to and supports both halves adjacent their axially extending free edges. Operation of the linkage moves both grate halves simultaneously and equally. Each grate halve comprises two axially extending grate panels connected to each other so as to permit pivoting about an axis close to their inner surfaces and parallel to the rotor axis. Adjusting linkage action causes the diametrically opposite free edges of each grate portion to be displaced both radially and circumferentially with respect to the rotor so that the connected grate panels pivot relative to one another as adjustment is made and so that in all adjustment positions radial clearance between the rotor and inner surfaces of the grate, at the free edges of the grate and adjacent the pivotal connection, remains approximately equal. The gaps between the free edges of the grate portions are bridged by cover plates.

8 Claims, 6 Drawing Figures

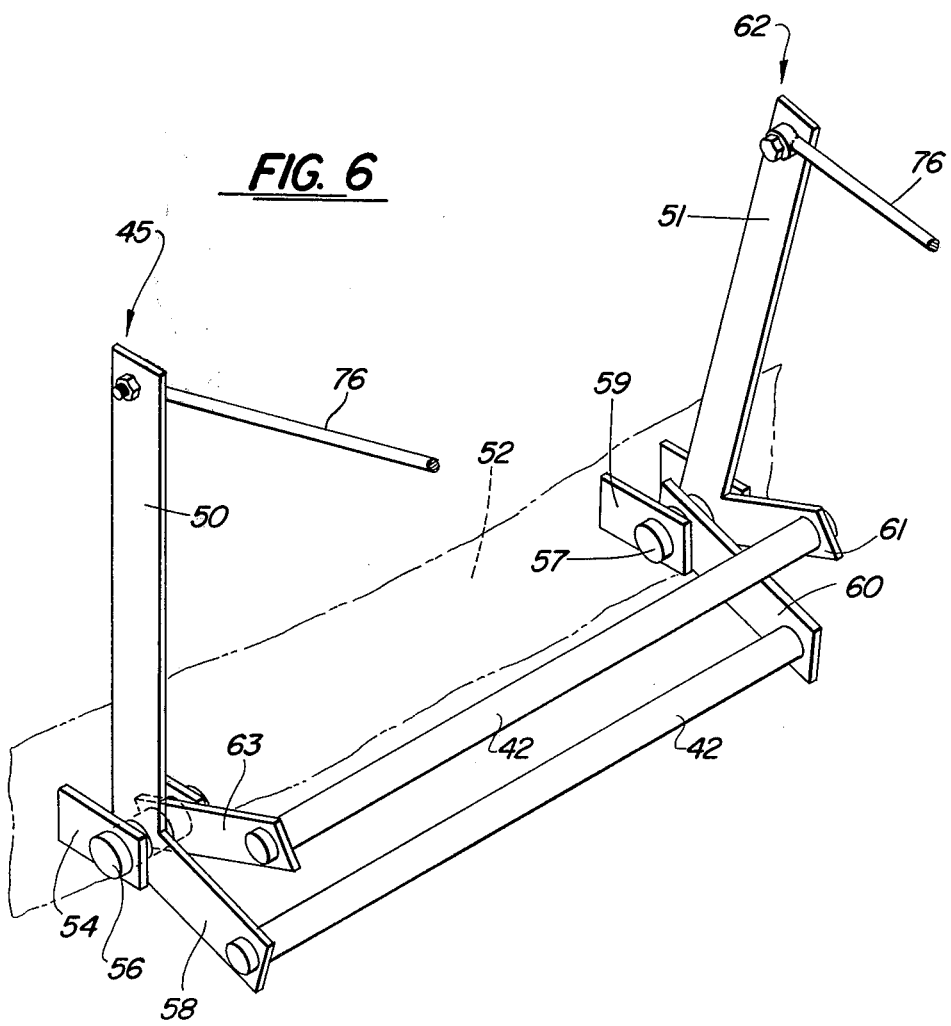

GRATE ADJUSTING ARRANGEMENT FOR AN AXIAL FLOW ROTARY THRESHER

BACKGROUND OF THE INVENTION

This invention relates to an axial flow thresher, usable, for example, in an axial flow combine harvester, and particularly to a grate clearance adjusting arrangement for such a thresher.

In one already known arrangement (see, for example, U.S. Pat. No. 3,589,111 Gullickson), the threshing grate, surrounding a rotor threshing portion, is formed in two halves pivoted together along a center line underneath the rotor. An adjusting device varies the separation between the top longitudinal edges of the grate halves. With such an arrangement, in which the gap or radial clearance remains fixed at the location of the pivot axis, the gap tapers, more or less, around the periphery over the adjustment range.

In another known arrangement (see, for example, U.S. Pat. No. 2,053,148 James), the grate consists of two diametrically opposed halves, each movable towards and away from the rotor axis so as to vary grate-to-rotor clearance. Clearly, when the radius of curvature of the grate halves is fixed, there will be a tapering clearance between each grate and rotor except when the grate is in a setting concentric with the rotor.

Both the above and other known adjustment arrangements result in configurations of grate to rotor clearance adverse to good threshing function.

SUMMARY OF THE INVENTION

Accordingly, an object of the present invention is to make it possible for grate clearance to be approximately constant around the rotor, even over a relatively wide range of grate adjustment.

According to the invention, there is provided an axial flow threshing device comprising a threshing rotor portion enclosed by a threshing grate which is formed of a plurality of axially extending side-by-side portions which are simultaneously adjustable by an adjusting mechanism to vary the size of the threshing clearance between the rotor and grate, wherein each grate portion comprises two circumferentially side-by-side panels pivotally connected to each other, and wherein the adjusting mechanism directly adjusts the disposition of adjacent, non-pivotally connected edges of the panels.

It is advantageous for the grate portions to be adjustable in such a way that the radial clearance between the inside surfaces of the grates and the surface of the rotor remains approximately the same over the entire rotor periphery and range of adjustment so that good threshing action is produced over the entire grate periphery. An approximation to the ideal of circumferentially uniform annular clearance in all adjustment settings is achieved if each grate portion comprises two panels pivotally connected to each other and supported by a mechanism operable to adjust the disposition of the opposite, non-pivotally connected or free, axially extending edges of the panels relative to the rotor periphery in such a way that there is relative pivoting between the connected panels of each portion.

BRIEF DESCRIPTION OF THE DRAWINGS

FIG. 6 is a partial perspective view of a portion of the adjustment linkage on the right-hand side of the grate.

DESCRIPTION OF THE PREFERRED EMBODIMENT

Figure 1:
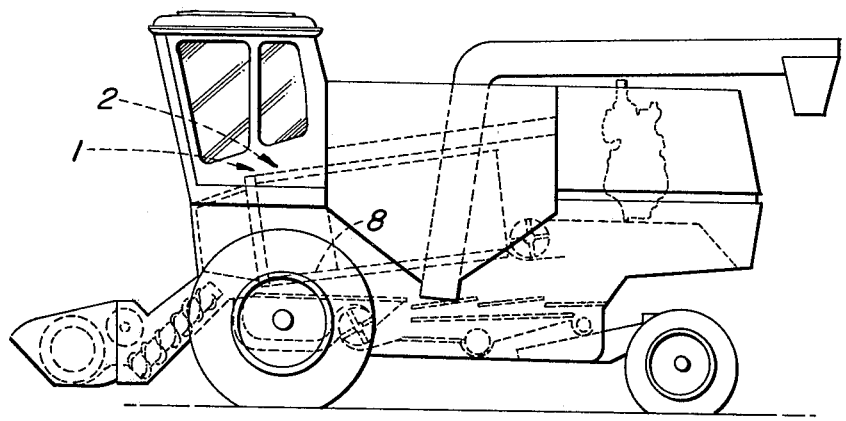
FIG. 1 is a side elevation of a self-propelled combine embodying the invention.

An exemplary embodiment of the invention is in the threshing section of an axial flow rotary separator of a self-propelled combine as indicated at 1 in FIG. 1.

Figure 2:
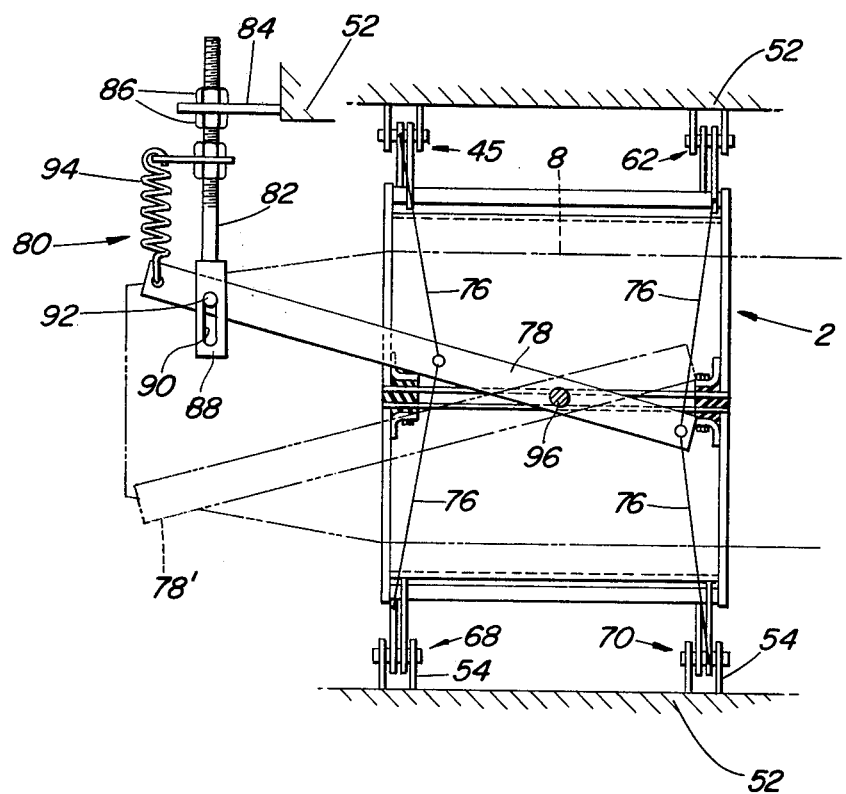
FIG. 2 is an overhead view of the threshing portion of the combine of FIG. 1.
Figure 3:
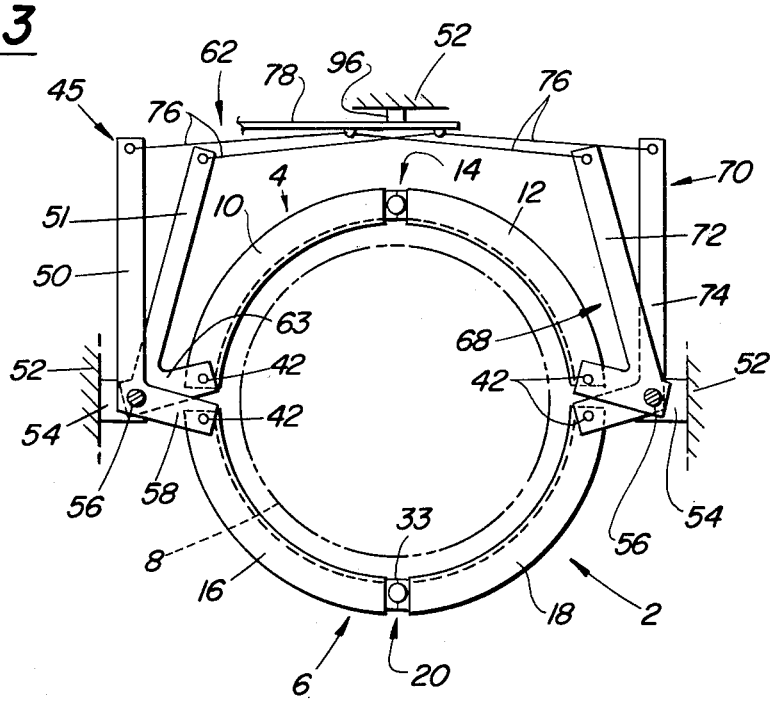
FIG. 3 is a front view of the grate assembly of FIG. 2.

As seen best in FIGS. 2 and 3, a threshing grate 2 is provided with mechanism for adjusting an upper threshing grate half 4 and a lower threshing grate half 6. The two threshing grate halves 4 and 6 completely surround a rotor threshing portion 8, which is shown only in phantom outline in FIGS. 2 and 3, extending in the longitudinal direction of the combine harvester. In order to convey the crop material spirally through the grate 2, the rotor portion 8 and/or the grate 2 may be provided with threshing and separating bars which are arranged in a helical configuration as is conventional but not shown in the drawings.

Figure 4:
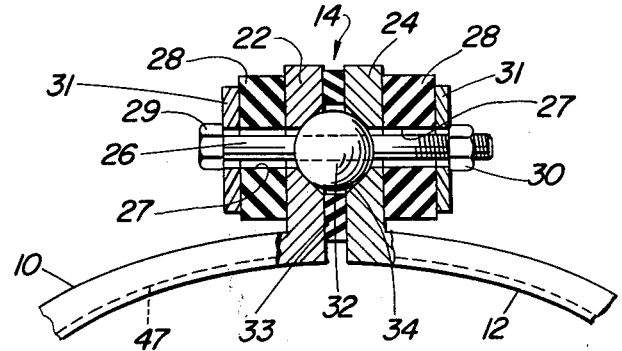
FIG. 4 is an enlarged partial cross-sectional view showing a pivoted connection between two panels of a grate half.

The upper grate half 4 is of hinged construction and comprises two equal-size threshing grate panels 10 and 12, which, as shown in FIG. 4, are pivotally connected together by way of an upper pivot joint 14. The lower grate 6 also comprises two equal-size threshing grate panels 16 and 18 which are pivotally connected to each other by way of a lower pivot joint 20. The grate panels 10 and 12 include radially extending flanges 22 and 24, respectively, forming part of the joint 14 (see FIG. 4). The joint 20 in the lower half is treated similarly. The flanges 22 and 24 extend over the entire length of the grate and, with respect to the axial direction, have rows of holes 27 for receiving tension bolts 26. Disposed between the flange 22 or 24 and the associated heads 29 of each bolt or associated nut 30 respectively is a supporting washer 31 or a bar which also extends over the entire length of the threshing grate portion 3 or 6 respectively. A pair of resilient spacer or spring members 28 have outer surfaces bearing against the supporting washers 31 and inner surfaces bearing against the respective flanges 22 or 24. The resilient spacer member 28, which may be, for example, in the form of a resilient strip or of compression springs on the bolts, make it possible for a pre-stressing force to be applied to the two flanges 22 and 24. This provides a vibration-free connection between the grate portions 10 and 12, 16 and 18, respectively. The flanges 22 and 24 of the grate portions 10 and 12, 16 and 18, respectively, are spaced from each other by means of pivot members such as spherical spacers 32 (one on each bolt 26), the gap so formed between the inside surfaces of the two flanges 22 and 24 being sealed by means of a resilient sealing strip 33. The spacers 32 may advantageously be accommodated in conical recesses 34 provided in the inside surfaces of the flanges 22 and 24. If, for example, the upper or lower grate halves 4 and 6 are adjusted, the grate panels 10 and 12, 16 and 18 can pivot about their respective pivot joints 14 or 20, at least until the flanges 22 and 24 come into contact in the region of their upper or lower edges, respectively.

Figure 5:
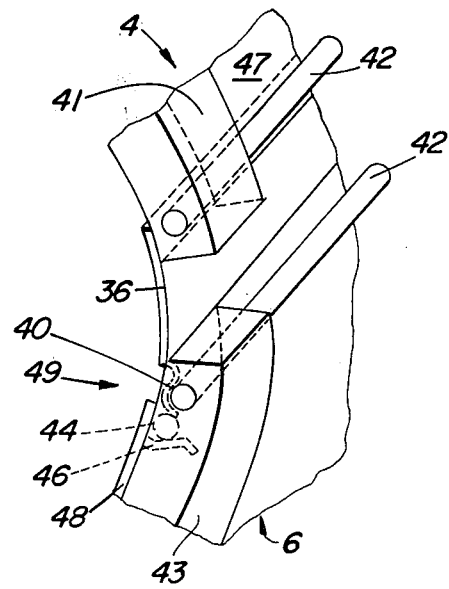
FIG. 5 is a partial perspective view of part of the two threshing grate halves in the region where they meet, with a cover plate bridging the gap between them.

As can be seen in particular from FIG. 3, the point of separation between the two threshing grate halves 4 and 6 is on the horizontal center plane of the threshing drum 8. In the region of the points of separation of the two threshing grate halves 4 and 6 (see FIG. 5), the edges of the halves 4 and 6 form a gap which also extends over the entire length of the two threshing grate halves 4 and 6 and which is closed with respect to the interior of the threshing grate 2 by means of a cover plate 36. The cover plate 36 is of an arcuate configuration and lies with its upper end against the inside of the lower end of the upper threshing grate half 4. As can also be seen from FIG. 5, the threshing grate halves 4 and 6 each have annular flanges 41 and 43, respectively (only part of which is shown in the drawings), with a respective threshing grate casing portion 47 connected to the flange. Although this is not shown in the drawings, the threshing grate 2 may have a plurality of successively disposed annular flanges 41 and 43 over its length of the flanges being provided to stiffen the threshing grate halves 4 and 6, respectively. The upper threshing grate half 4 and the lower threshing grate half 6 have, in the region of their point of separation, torsion bars 42 which are mounted in bores of the annular flanges 41 and 43.

Disposed between the torsion bar 42 of the lower threshing grate half 6 and the upper end of the annular flange 43 is a recess which serves to receive the first half of an S-shaped clip 49 which is provided on the lower end of the cover plate 36. The second half of the S-shaped clip 49 lies on the inside of the torsion bar 42, while the inwardly directed surface of the S-shaped clip 49 bears against a spring member 44 which is arranged on the annular flange 43 and which holds the S-shaped clip 49 on the torsion bar 42. For this purpose the spring member 44 is received in a pocket which is formed by a holder 46 and a contact portion 48 which is fixedly connected thereto, with the holder 46 and the contact portion 48 being secured to the inside of the lower annular flange 43. By virtue of the arrangement of the spring member 44, the cover plate 36 is pressed continuously against the inside surface of the two threshing grate halves 4 and 6. The cover plate 36 shown in FIG. 4 is preferably resiliently connected to one grate half so that it is biased against the inner surface of the other half but it may, alternatively, be fixedly connected to one threshing grate half 4 or 6 by way of screws or rivets. However, the other edge of the cover plate 36 must be freely movable relative to the opposite threshing grate half, and must only lie against the inside surface of the corresponding threshing grate half 4 or 6 respectively, in order to permit mutual displacement of the two threshing grate halves 4 and 6.

As shown in particular by FIGS. 3 and 6, the respective right-hand and left-hand adjusting linkages comprise two adjusting members 45 and 62, 68 and 70 respectively, associated together in pairs. As the right-hand and left-hand assemblies are identical to each other, except for being of opposite hand, only the right-hand adjusting members 45 and 62 are described in greater detail hereinafter (see FIG. 6).

The adjusting member 45 comprises a cranked lever 50 which is mounted pivotally by means of a pin 56 on a holder 54 which is carried on the frame 52 of the combine harvester. The cranked lever 50 (see FIG. 6) is connected by its lower arm 58 by way of the torsion bar 42 to a link 60 which is arranged at a spacing from the arm 58 and which is mounted pivotally by way of a pin 57 on a second holder 59 disposed on the frame 52. The second adjusting member 62 is of a similar design to the first adjusting member 45. The adjusting member 62 has a cranked lever 51 which is connected by its lower arm 61 by way of the torsion bar 42 to a link 63 which is mounted pivotally on the holder 54 by way of the first pin 56. The adjusting member 45 differs from the adjusting member 62 only insofar as the angle between the arms of the cranked lever 50 is greater than the angle between the arms of the second cranked lever 51. The adjusting member 45 is provided for adjustment of the right-hand side of the lower threshing grate half 6, and the adjusting member 62 is provided for adjustment of the left-hand side of the upper threshing grate half 4.

As will be seen from FIG. 3, provided on the left-hand side of the threshing grate halves 4 and 6 are two identical adjusting members 68 and 70, the adjusting member 68 comprising a cranked lever 72 and the adjusting member 70 comprising a cranked lever 74, connected to the torsion bars 42.

The upper ends of the angle lever 50, 51, and 72, 74 are connected by way of links 76 to an adjusting lever 78 which is mounted pivotally on the frame 52 of the combine harvester by way of a pivot pin 96. As will be seen in particular from FIGS. 2 and 3, the rear right-hand part of the adjusting lever 78 is connected by way of the links 76 to the adjusting member 74 for the lower threshing grate half 6, and to the left-hand angle lever 51 of the upper threshing grate half 4, while the front left-hand side of the adjusting lever 78 is connected by way of the links 76 to the cranked lever 72 for the upper threshing grate half 4 and to the cranked lever 50 for the lower threshing grate half 6. As the cranked levers 51 and 72, which engage the upper threshing grate half 4, are of a more severly bent configuration, the distance between the connections for the links 76 is less than the distance between the connections of the cranked levers 50 and 74 for the lower threshing grate half 6. For this reason, with respect to the vertical longitudinal center plane of the threshing grate halves 4 and 6, the connection of the cranked levers 50 and 72, in the plan view of FIG. 2, is on one side of the vertical center plane, while the connection of the links 76 for the cranked levers 51 and 74 is on the other side of the vertical center plane. The links 76 which are connected to the adjusting lever 78 are adjusted jointly by way of an adjusting means 80. The adjusting means 80 comprises an adjusting screw 82 which is carried displaceably in a holder 84 provided on the frame 52, and is fixed at different positions by means of nuts 86. The connection between the adjusting lever 78 and the adjusting screw 82 comprises a fork member 88 for receiving the outer end of the adjusting lever 78 and a guide slot 90 through which extends a pin 92 secured to the adjusting lever 78. The free end of the adjusting lever 78 is connected to the adjusting screw 82 by way of a spring 94. The slotted connection of the adjusting lever 78 to the adjusting screw 82 permits deflection of the adjusting lever 78 allowing retraction or increased grate clearance if an overload condition occurs in the threshing grates 4 and 6. By adjusting the screw 82 in the holder 84, the two threshing grate halves 4 and 6 can be adjusted upwardly or downwardly from their normal position as shown in FIG. 2, in order thereby to increase the width of the gap between the inside of the threshing grate halves 4 and 6 and the surface of the threshing rotor portion 8. As the upper threshing grate half 4 and the lower threshing grate half 6 are each again divided into two equal parts and are connected together by way of the pivot joints 14 and 20 respectively, the adjustment also slightly opens out the parts of each grate half when the gap is increased and slightly folds together the parts of each grate half when the gap is decreased. In this way, when the two threshing grate halves 4 and 6 are adjusted, an approximately equal annular gap can be set over the entire periphery of the threshing rotor portion 8, if, for example, the adjusting lever 78 is adjusted from the position shown in FIG. 2 into the position 78' shown in phantom.

In order to understand better the way in which an approximately uniform gap is maintained, an explanation will be given solely in relation to the panel 10 of the upper grate half and for the case of increasing the gap from the situation in which the gap is truly uniform (i.e., with the panel concentric with the rotor). If the panel 10 were merely pivoted open about a fixed pivot 14, much as in one form of the prior art, the gap would taper decreasingly from the pivot 42 around to the pivot 14. If the panel were merely shifted bodily upwards, the gap would taper decreasingly from the pivot 14 around to the pivot 42. If both movements are combined, and given suitable positioning of the pivot 56 relative to the pivot 42, it can be arranged that the change in clearance adjacent the pivots 14 and 42 are equal. It is true that the clearance will be a little bigger at the center of the panel (because the curvature of the panel will be too small for its new position), but the overall clearance variation will be substantially reduced.

Instead of the adjusting means 80 shown in FIG. 2, it is also possible to use a powered adjusting means which automatically produces adjustment of the adjusting lever 78 responsive to changes in the through-put of crop material. For this purpose, the power means motor is connected to the threshing and separating region by way of a sensor (or sensors) which signals the rate of through-put of crop material or overloading of the system, for example, due to uneven feeding of crop material, and responds accordingly.

I claim:

1. An axial flow rotary separator comprising:
   a frame;
   a rotor rotatably supported by the frame and having a threshing section;
   a housing supported by the frame and surrounding the rotor so as to define an annular space and including at least one articulated grate portion at least partially wrapping the threshing section of the rotor and including two arcuate side-by-side axially extending panels and means for hingedly coupling the panels for pivoting movement of one panel relative to the other about a hinge axis parallel to the axis of the rotor;
   linkage means carried by the frame and pivotally connected to and supporting the grate portion only at a pair of spaced connecting points, one on each panel and remote from the hinge axis, and operable to adjust the radial spacing between the rotor amd the grate portion and so articulated that actuation of the linkage results in biasing the connecting points in approximately symmetrical non-radial respective directions with respect to the rotor axis so that relative pivoting between the grate panels is in a direction tending to equalize changes in radial spacing between the rotor and circumferentially spaced points on the respective panels resulting from such adjustment; and
   means for rotating the rotor and for engaging crop material in the annular space so that when crop material is introduced into the annular space, the rotor cooperates with the housing to propel the material in a generally spiral path while threshing the material, the adjustability of the grate portion providing for controlling the efficiency of the threshing action.

2. The separator of claim 1 wherein the housing includes two articulated grate portions, having juxtaposed axially extending opposite edges, each portion spanning about 180° of arc with respect to the rotor periphery so that the respective outer edges of the grate portions are adjacent.

3. The separator of claim 2 wherein the linkage means is connected to and is operable to adjust the two grate portions simultaneously and equally.

4. The separator of claim 2 wherein the linkage means includes a control lever pivotally carried by the frame and linkage members connecting the control lever to the respective grate portions so that movement of the control lever effects the simultaneous adjustment of the two grate portions and an adjustable coupling for connecting between the control lever and the frame for securing the lever so that the grate portions may be maintained in a selected adjustment position.

5. The separator of claim 4 wherein the adjustable coupling is resiliently yieldable, responsive to a predetermined radially outward force on one of the grate portions.

6. The separator of claim 2 wherein the juxtaposed edges of the grate panels of the mating grate portions are circumferentially spaced defining a gap and further including an axially extending cover plate and means for connecting the cover plate to one of the grate panels so that it extends over and substantially closes the gap between the edges of the panels.

7. The separator of claim 6 wherein the unsupported edge of the cover plate is disposed adjacent the inner surface of the adjacent grate panel and the mounting means includes means for biasing the cover plate against said panel.

8. The separator of claim 1 wherein the means for pivotally connecting the grate panels includes, on each panel adjacent the hinge axis, a radially outwardly extending flange, a pivot member disposed between the juxtaposed flanges of the two panels and clamping and retaining means for engaging the flanges and pivot member, having a line of action passing through the pivot member so as to maintain the flanges in register while permitting relative pivoting of the grate panels one to another through rocking of the flanges on the pivot member.

* * * * *